United States Patent
Jo

(10) Patent No.: US 10,877,246 B2
(45) Date of Patent: Dec. 29, 2020

(54) OPTICAL IMAGING SYSTEM

(71) Applicant: Samsung Electro-Mechanics Co., Ltd, Suwon-si (KR)

(72) Inventor: Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 322 days.

(21) Appl. No.: 15/085,429

(22) Filed: Mar. 30, 2016

(65) Prior Publication Data

US 2017/0102522 A1 Apr. 13, 2017

(30) Foreign Application Priority Data

Oct. 13, 2015 (KR) .......... 10-2015-0142840

(51) Int. Cl.
| | | |
|---|---|---|
| G02B 9/60 | (2006.01) |
| G02B 13/00 | (2006.01) |
| G02B 5/00 | (2006.01) |
| G02B 5/20 | (2006.01) |
| G02B 27/00 | (2006.01) |

(52) U.S. Cl.
CPC .......... *G02B 13/0045* (2013.01); *G02B 5/005* (2013.01); *G02B 5/208* (2013.01); *G02B 9/60* (2013.01); *G02B 27/0025* (2013.01)

(58) Field of Classification Search
CPC .... G02B 13/0045; G02B 5/005; G02B 5/208; G02B 9/60; G02B 27/0025
USPC .......... 359/774, 753, 763, 764, 687
See application file for complete search history.

(56) References Cited

U.S. PATENT DOCUMENTS

| | | | |
|---|---|---|---|
| 9,207,432 B2 | 12/2015 | Tanaka et al. | |
| 2010/0220229 A1 | 9/2010 | Sano | |
| 2011/0013069 A1* | 1/2011 | Chen | G02B 9/60 348/335 |
| 2011/0134305 A1 | 6/2011 | Sano et al. | |
| 2011/0249346 A1* | 10/2011 | Tang | G02B 13/0045 359/764 |

(Continued)

FOREIGN PATENT DOCUMENTS

| | | |
|---|---|---|
| CN | 103309015 A | 9/2013 |
| CN | 204101797 U | 1/2015 |

(Continued)

OTHER PUBLICATIONS

Chinese Office Action dated Jun. 5, 2018 in counterpart Chinese Patent Application No. 201610248084.X (17 pages, in Chinese with English translation).

(Continued)

*Primary Examiner* — Travis S Fissel
(74) *Attorney, Agent, or Firm* — NSIP Law

(57) ABSTRACT

There is provided an optical imaging system includes a first lens, a second lens, a third lens, a fourth lens, and a fifth lens. The first lens includes a convex object-side surface and a concave image-side surface. The second lens includes a concave object-side surface and a concave image-side surface. The third lens includes a concave object-side surface. The fourth lens includes a concave object-side surface. The fifth lens includes a concave object-side surface and a concave image-side surface. The first to fifth lenses are sequentially disposed from an object side toward an imaging plane.

14 Claims, 6 Drawing Sheets

(56) References Cited

U.S. PATENT DOCUMENTS

| | | | |
|---|---|---|---|
| 2012/0327520 A1* | 12/2012 | Tsai | G02B 13/0045 |
| | | | 359/714 |
| 2013/0235474 A1 | 9/2013 | Tsai et al. | |
| 2014/0049834 A1* | 2/2014 | Lee | G02B 13/0045 |
| | | | 359/676 |
| 2014/0049843 A1 | 2/2014 | Kubota et al. | |
| 2015/0022701 A1* | 1/2015 | Chen | G02B 9/60 |
| | | | 348/294 |
| 2015/0085385 A1* | 3/2015 | Tanaka | G02B 9/60 |
| | | | 359/764 |
| 2015/0146076 A1* | 5/2015 | Ohtsu | G02B 9/60 |
| | | | 348/340 |
| 2016/0170182 A1* | 6/2016 | Tanaka | G02B 13/0045 |
| | | | 359/713 |

FOREIGN PATENT DOCUMENTS

| | | |
|---|---|---|
| JP | 2014-38230 A | 2/2014 |
| KR | 10-2009-0131805 A | 12/2009 |
| KR | 10-2010-0001525 A | 1/2010 |

OTHER PUBLICATIONS

Korean Office Action issued in corresponding Korean Patent Application No. 10-2015-0142840 dated May 2, 2017 (6 pages in English; 5 pages in Korean).

* cited by examiner

| FIRST EMBODIMENT | | | | | |
|---|---|---|---|---|---|
| F number= 2.60 | | TTL = 5.45 | f = 5.85 | | |
| SURFACE NO. | | RADIUS OF CURVATURE | THICKNESS/ DISTANCE | REFRACTIVE INDEX | ABBE NUMBER | FOCAL LENGTH |
| 0 | STOP | | −0.2096 | | | |
| 1 | FIRST LENS | 1.4644 | 0.6319 | 1.544 | 55.0 | 2.790 |
| 2 | | 30.5488 | 0.1000 | | | |
| 3 | SECOND LENS | −23.1755 | 0.3000 | 1.639 | 25.0 | −4.130 |
| 4 | | 3.0389 | 0.6057 | | | |
| 5 | THIRD LENS | −9.2754 | 0.3267 | 1.639 | 25.0 | 11.750 |
| 6 | | −4.2340 | 0.3699 | | | |
| 7 | FOURTH LENS | −4.4705 | 0.3000 | 1.639 | 25.0 | 13.90 |
| 8 | | −3.0636 | 0.3625 | | | |
| 9 | FIFTH LENS | −2.7112 | 0.3000 | 1.536 | 55.0 | −4.200 |
| 10 | | 15.7434 | 0.1000 | | | |
| 11 | FILTER | INFINITY | 0.3000 | 1.517 | 64.2 | |
| 12 | | INFINITY | 1.6451 | | | |
| 13 | IMAGING PLANE | INFINITY | 0.0100 | | | |

FIG. 3

| SECOND EMBODIMENT ||||||
| --- | --- | --- | --- | --- | --- |
| F number = 2.60 | TTL = 5.45 | | f = 5.70 | | |
| SURFACE NO. | RADIUS OF CURVATURE | THICKNESS/ DISTANCE | REFRACTIVE INDEX | ABBE NUMBER | FOCAL LENGTH |
| 0 STOP | | −0.2096 | | | |
| 1 FIRST LENS | 1.5163 | 0.7161 | 1.544 | 55.0 | 3.140 |
| 2 | 10.9080 | 0.1067 | | | |
| 3 SECOND LENS | 16.1703 | 0.3000 | 1.640 | 22.0 | −5.480 |
| 4 | 2.9232 | 0.7096 | | | |
| 5 THIRD LENS | −19.9414 | 0.3177 | 1.640 | 22.0 | 23.030 |
| 6 | −8.6594 | 0.5840 | | | |
| 7 FOURTH LENS | −4.9267 | 0.3169 | 1.640 | 22.0 | 11.88 |
| 8 | −3.0980 | 0.3204 | | | |
| 9 FIFTH LENS | −2.7112 | 0.3499 | 1.529 | 55.0 | −4.640 |
| 10 | 32.0078 | 0.1000 | | | |
| 11 FILTER | INFINITY | 0.1100 | 1.517 | 64.2 | |
| 12 | INFINITY | 1.3050 | | | |
| 13 IMAGING PLANE | INFINITY | −0.0216 | | | |

FIG. 6

OPTICAL IMAGING SYSTEM

CROSS-REFERENCE TO RELATED APPLICATIONS

This application claims the benefit under 35 USC 119(a) of Korean Patent Application No. 10-2015-0142840 filed on Oct. 13, 2015, in the Korean Intellectual Property Office, the entire disclosure of which is incorporated herein by reference for all purposes.

BACKGROUND

1. Field

The following description relates to an optical imaging system including lenses.

2. Description of Related Art

An optical imaging system mounted in a camera module of a portable terminal includes a plurality of lenses. As an example, an optical imaging system may include five or more lenses in order to allow an optical system to capture images having a high level of resolution.

In order to realize a dual-camera system, a camera module having a wide field of view and a camera module having a narrow field of view are required. Recently, the development of a camera module having a wide field of view has been significantly undertaken. However, the development of camera modules having a narrow field of view has not been actively conducted. Therefore, there is a need to develop an optical imaging system appropriate for the camera module having a narrow field of view.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system, including: a first lens including a convex object-side surface and a concave image-side surface; a second lens including a concave object-side surface and a concave image-side surface; a third lens including a concave object-side surface; a fourth lens including a concave object-side surface; and a fifth lens including a concave object-side surface and a concave image-side surface, wherein the first to fifth lenses are sequentially disposed from an object side toward an imaging plane.

The first lens may include a positive refractive power.
The second lens may include a negative refractive power.
The third lens may include a positive refractive power.
The fourth lens may include a positive refractive power.
The fifth lens may include a negative refractive power.

In accordance with another embodiment, there is provided an optical imaging system, including: a first lens including a convex object-side surface and a concave image-side surface; a second lens including a concave image-side surface; a third lens including a concave object-side surface; a fourth lens including a concave object-side surface; and a fifth lens including a concave object-side surface and a concave image-side surface, wherein the first to fifth lenses are sequentially disposed from an object side toward an imaging plane, and $0.7<TTL/f<1.1$, where TTL is a distance from the object-side surface of the first lens to the imaging plane, and f is an overall focal length of the optical imaging system.

The first lens may include a positive refractive power.
The second lens may include a negative refractive power.
An object-side surface of the second lens may be convex.
The fourth lens may include a positive refractive power.
An object-side surface of the third lens may be convex.
An object-side surface of the fourth lens may be convex.

In accordance with an embodiment, there is provided an optical system, including: a first lens; a second lens including a concave image-side surface; a third lens including a concave object-side surface and a convex image-side surface; a fourth lens including a concave object-side surface; and a fifth lens including a concave object-side surface, a concave image-side surface, and a meniscus shape, wherein the first lens has a refractive power same as a refractive power of the third lens and the fourth lens, and different from a refractive power of the second lens and the fifth lens, and second lens, the third lens, and the fourth lens have a refractive index greater than 1.60.

TTL, a distance from the object-side surface of the first lens to the imaging plane, and f, an overall focal length of the optical imaging system, may satisfy $0.7<TTL/f<1.1$.

TTL, a distance from the object-side surface of the first lens to the imaging plane, and ImgH, a distance from a center of the imaging plane to a corner, may satisfy $1.1<TTL/ImgH$.

FOV, a half of a field of view of the optical imaging system, and f, an overall focal length of the optical imaging system, may satisfy $20<FOV<35$.

R1, a radius of curvature of the object-side surface of the first lens, and f, an overall focal length of the optical imaging system, may satisfy $0.16<R1/f<2.0$.

The first lens may include a convex object-side surface and a concave image-side surface.

The second lens may include a concave object-side surface and the fourth lens may include a convex image-side surface.

The second lens may include a convex object-side surface and the fourth lens may include a convex image-side surface.

The first lens, the third lens, and the fourth lens may include a positive refractive power and the second lens and the fifth lens may include a negative refractive power.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of lenses of the optical imaging system illustrated in FIG. 1;

FIG. 6 is a table representing characteristics of lenses of the optical imaging system illustrated in FIG. 4.

Figure 1:
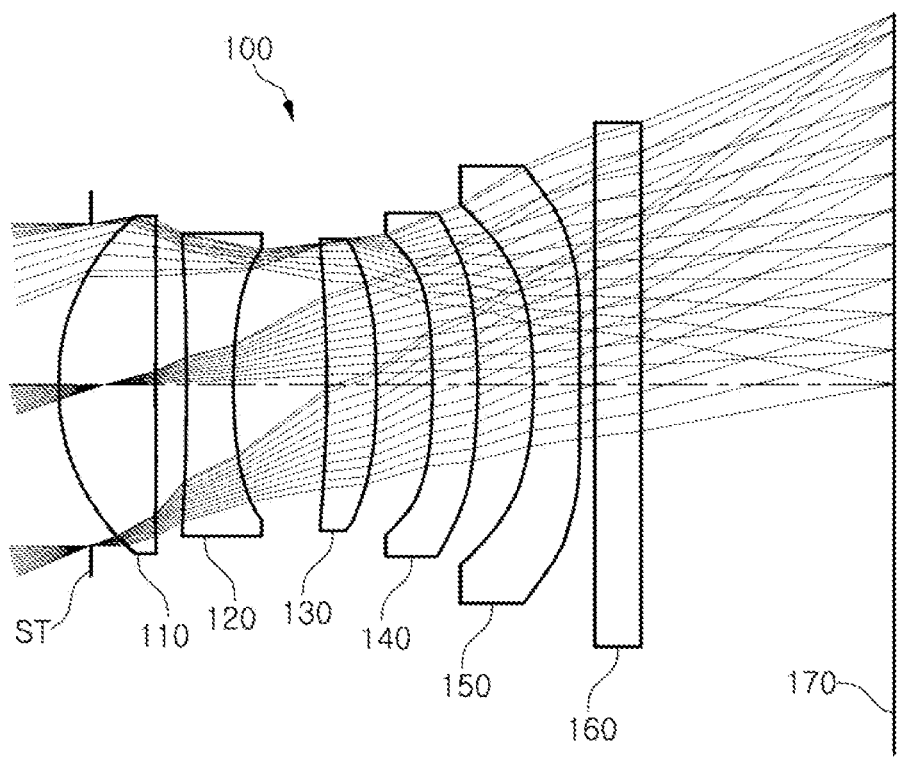
FIG. 1 is a view of an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The various embodiments described below may have a variety of configurations and propose only a required configuration herein, but are not limited thereto.

In addition, a surface of each lens closest to an object is referred to as a first surface or an object-side surface, and a surface of each lens closest to an imaging plane is referred to as a second surface or an image-side surface. Further, in the present specification, all radii of curvature, thicknesses, optical axis distances from the first surface of the first lens to the image sensor (OALs), distances on the optical axis between the stop and the image sensor (SLs), image heights or one-half of a diagonal length of the imaging plane (ImgHs), back focal lengths (BFLs) of the lenses, an overall focal length of an optical system, and a focal length of each lens are indicated in millimeters (mm). However, a person skilled in the relevant art will appreciate that other units of measurement may be used. Further, thicknesses of lenses, gaps between the lenses, OALs, and SLs are distances measured based on an optical axis of the lenses. Further, in a description of shapes of the lenses, a statement that a surface of a lens is convex means that an optical axis portion of the surface of the lens is convex, and a statement that a surface of a lens is concave means that an optical axis portion of the surface of the lens is concave. Therefore, even if a surface of a lens is described as being convex, an edge portion of the surface of the lens may be concave. Likewise, even if a surface of a lens is described as being concave, an edge portion of the surface of the lens may be convex. In other words, a paraxial region of a lens may be convex, while the remaining portion of the lens outside the paraxial region may be convex, concave, or flat. Further, a paraxial region of a lens may be concave, while the remaining portion of the lens outside the paraxial region may be convex, concave, or flat.

In the optical system, according to embodiments, the first to fifth lenses are formed of materials including glass, plastic or other similar types of polycarbonate materials. In another embodiment, at least one of the first through fifth lenses is formed of a material different from the materials forming the other first through fifth lenses.

An optical imaging system includes an optical system including lenses. For example, the optical system of the optical imaging system may include five lenses having refractive power. However, the optical imaging system is not limited to including only the lenses having the refractive power. For example, the optical imaging system may include a stop to control an amount of light. In addition, the optical imaging system may further include an infrared cut-off filter filtering infrared light. Further, the optical imaging system may further include an image sensor, such as an imaging device, configured to convert an image of a subject incident thereto through the optical system into electrical signals. Further, the optical imaging system may further include a gap maintaining member adjusting a gap between lenses.

First to fifth lenses are formed of materials having a refractive index different from that of air. For example, the first to fifth lenses are formed of plastic or glass. At least one of the first to fifth lenses has an aspherical shape. As one example, only the fifth lens of the first to fifth lenses has the aspherical shape. In addition, at least one surface of all of the first to fifth lenses is aspherical. In an example, an aspherical surface of each lens is represented by the following Equation 1:

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \quad \text{[Equation 1]}$$

In this equation, c is an inverse of a radius of curvature of the lens, k is a conic constant, r is a distance from a certain point on an aspherical surface of the lens to an optical axis, A to J are aspherical constants, and Z is a distance between the certain point on the aspherical surface of the lens at the distance Y and a tangential plane meeting the apex of the aspherical surface of the lens.

An optical imaging system, in accordance with an embodiment, includes five lenses, a filter, an image sensor, and a stop. Next, the above-mentioned components will be described.

The first lens has a refractive power. For example, the first lens has a positive refractive power.

The first lens has a meniscus shape. For example, an object-side surface of the first lens is convex, and an image-side surface thereof is concave. In an alternative embodiment, the image-side surface of the first lens is flat or substantially flat.

The first lens has an aspherical surface. For example, both surfaces of the first lens are aspherical. The first lens is formed of a material having high light transmissivity and excellent workability. For example, the first lens is formed of plastic. However, a material of the first lens is not limited to the plastic. For example, the first lens may be formed of glass.

The second lens has a refractive power. For example, the second lens has a negative refractive power.

The second lens has a meniscus shape. For example, an image-side surface of the second lens is concave. In one example, the image-side surface of the second lens is concave in a paraxial region and gradually flattens at edge portions thereof. An object-side surface of the second lens is concave. In an alternative example, the object-side surface of the second lens is flat or substantially flat.

The second lens has an aspherical surface. For example, the image-side surface of the second lens is aspherical. The second lens is formed of a material having high light transmissivity and excellent workability. For example, the second lens is formed of plastic. However, a material of the second lens is not limited to plastic. For example, the second lens may be formed of glass.

The second lens is formed of a material having a high refractive index. For example, a refractive index of the second lens may be 1.60 or more. The second lens may have a low Abbe number. For example, an Abbe number of the second lens is 30 or less. The second lens configured as described above effectively improves chromatic aberration by the first lens.

The third lens has a refractive power. For example, the third lens has a positive refractive power.

The third lens has a meniscus shape. For example, an object-side surface of the third lens is concave, and an image-side surface thereof is convex.

The third lens has an aspherical surface. For example, both surfaces of the third lens may be aspherical. The third lens is formed of a material having high light transmissivity and excellent workability. For example, the third lens is formed of plastic. However, a material of the third lens is not limited to plastic. For example, the third lens may be formed of glass.

The third lens is formed of a material having a high refractive index. For example, a refractive index of the third lens is 1.60 or more. The third lens may have a small Abbe number. For example, an Abbe number of the third lens is 30 or less.

The fourth lens has a refractive power. For example, the fourth lens has a positive refractive power.

The fourth lens has a meniscus shape. For example, an object-side surface of the fourth lens is concave, and an image-side surface thereof is convex. In one example, the object-side surface of the fourth lens is concave in a paraxial region and gradually flattens at edge portions thereof.

The fourth lens has an aspherical surface. For example, both surfaces of the fourth lens are aspherical. The fourth lens is formed of a material having high light transmissivity and excellent workability. For example, the fourth lens is formed of plastic. However, a material of the fourth lens is not limited to plastic. For example, the fourth lens may be formed of glass.

The fourth lens is formed of a material having a high refractive index. For example, a refractive index of the fourth lens is 1.60 or more. The fourth lens may have a small Abbe number. For example, an Abbe number of the fourth lens is 30 or less.

The fifth lens has a refractive power. For example, the fifth lens has a negative refractive power.

The fifth lens has a meniscus shape. For example, both object-side and image-side surfaces of the fifth lens are concave.

The fifth lens has an aspherical surface. For example, both surfaces of the fifth lens are aspherical. The fifth lens is formed of a material having high light transmissivity and excellent workability. For example, the fifth lens may be formed of plastic. However, a material of the fifth lens is not limited to plastic. For example, the fifth lens may be formed of glass.

A person of ordinary skill in the relevant art will appreciate that each of the first through fifth lenses may be configured in an opposite refractive power from the configuration described above. For example, in an alternative configuration, the first lens has a negative refractive power, the second lens has a positive refractive power, the third lens has a negative refractive power, the fourth lens has a negative refractive power, and the fifth lens has a positive refractive power. Other variations of the refractive power for the above-described embodiment may be implemented.

The filter filters a partial wavelength from incident light incident through the first to fifth lenses. For example, the first filter filters an infrared wavelength of the incident light.

The image sensor may realize high-resolution images of 1300 megapixels. For example, a unit size of pixels configuring the image sensor may be 1.12 μm or less.

The stop is disposed in order to adjust an amount of light incident to the lenses. For example, the stop is adjacently disposed to the object-side surface of the first lens. However, a person skilled in the art that the stop may be placed at other positions, such as between the lenses, and more than one stop may be implemented.

The optical imaging system satisfies the following Conditional Expressions 1 through 4:

[Conditional Expression 1] $0.7 < TTL/f < 1.1$
[Conditional Expression 2] $1.1 < TTL/ImgH$
[Conditional Expression 3] $20 < FOV < 35$
[Conditional Expression 4] $0.16 < R1/f < 2.0$.

In one example, TTL is a distance from the object-side surface of the first lens to the imaging plane, f is an overall focal length of the optical imaging system, ImgH is a distance from a center of the imaging plane to a corner, FOV is a half of a field of view of the optical imaging system, and R1 is a radius of curvature of the object-side surface of the first lens.

The optical imaging system satisfying the above Conditional Expressions 1 through 4 is easily miniaturized and may be mounted in a small terminal.

Also, in one embodiment, each of the first to fifth lenses may be separate lenses configured as described above. A distance between lenses may vary. In another embodiment, at least one of the first to fifth lenses may be operatively connected or in contact with another one of the first to fifth lenses.

An optical imaging system, according to a first embodiment, will be described with reference to FIG. 1.

The optical imaging system 100, according to the first embodiment, includes an optical system including a first lens 110, a second lens 120, a third lens 130, a fourth lens 140, and a fifth lens 150. In addition, the optical imaging system 100 includes a filter 160, an image sensor 170, and a stop ST.

In an embodiment, the first lens 110 has a positive refractive power, and an object-side surface thereof is convex and an image-side surface thereof is concave. For example, the object-side surface of the first lens 110 is convex in a paraxial region, and the image-side surface of the first lens 110 is concave in the paraxial region. The second lens 120 has a negative refractive power, and both surfaces thereof are concave. For example, the object-side surface of the second lens 120 is concave in a paraxial region, and the image-side surface of the second lens 120 is concave in the paraxial region. The third lens 130 has a positive refractive power, and an object-side surface thereof is concave and an image-side surface thereof is convex. For example, the object-side surface of the third lens 13 is concave in a paraxial region, and the image-side surface of the third lens 130 is convex in the paraxial region. The fourth lens 140 has a positive refractive power, and an object-side surface thereof is concave and an image-side surface thereof is convex. For example, the object-side surface of the fourth lens 140 is concave in a paraxial region, and the image-side surface of the fourth lens 140 is convex in the paraxial region. The fifth lens 150 has a negative refractive power, and both surfaces thereof are concave. For example, the object-side surface of the fifth lens 150 is concave in a paraxial region, and the image-side surface of the fifth lens 150 is concave in the paraxial region. The stop ST is adjacently disposed to the object-side surface of the first lens.

Figure 2:
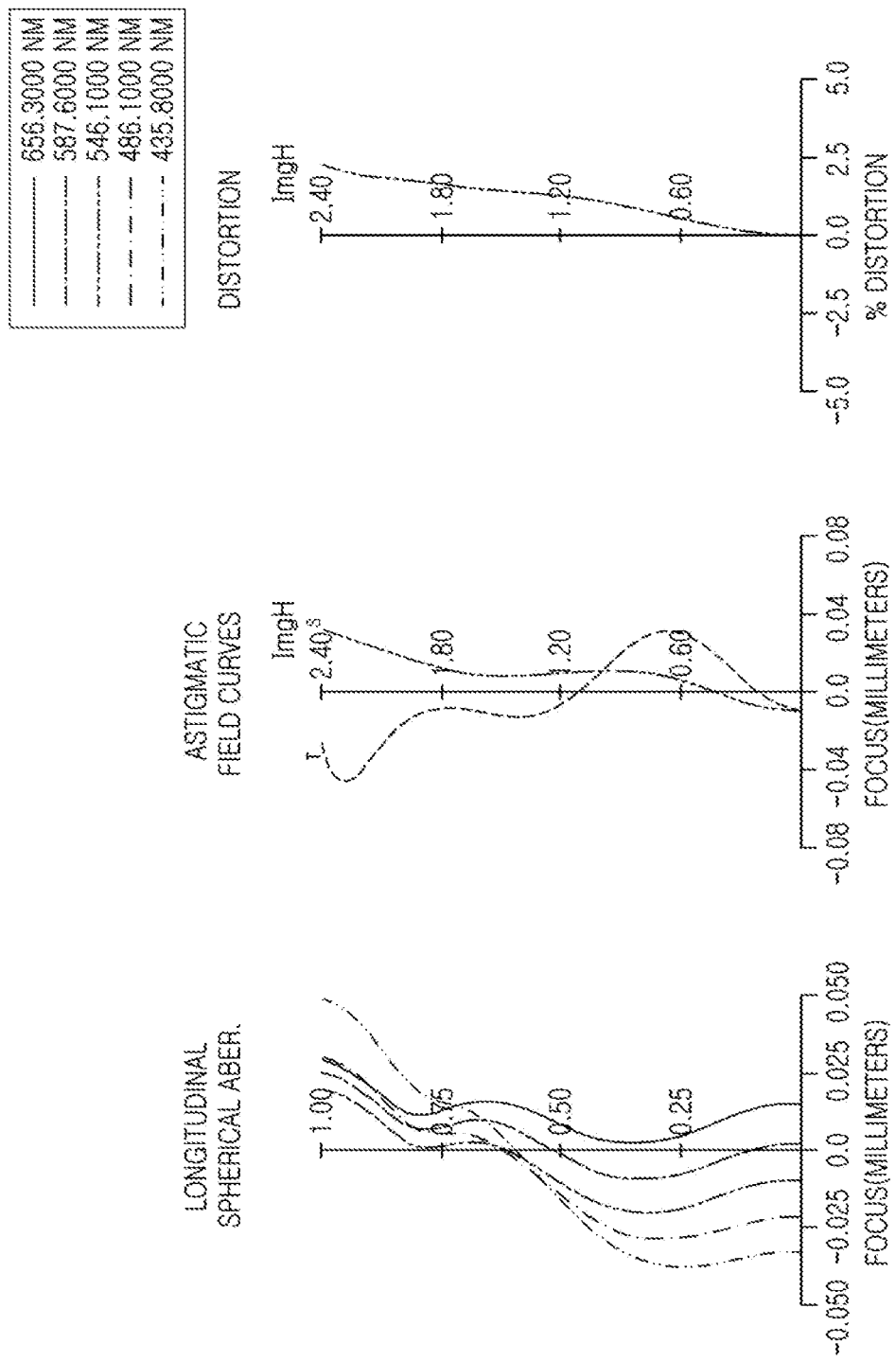
FIG. 2 are graphs representing aberration curves of the optical imaging system illustrated in FIG. 1.

The optical imaging system configured as described above may represent aberration characteristics as illustrated in FIG. 2. FIG. 3 is a table representing characteristics of lenses of the optical imaging system according to the first embodiment.

Figure 4:
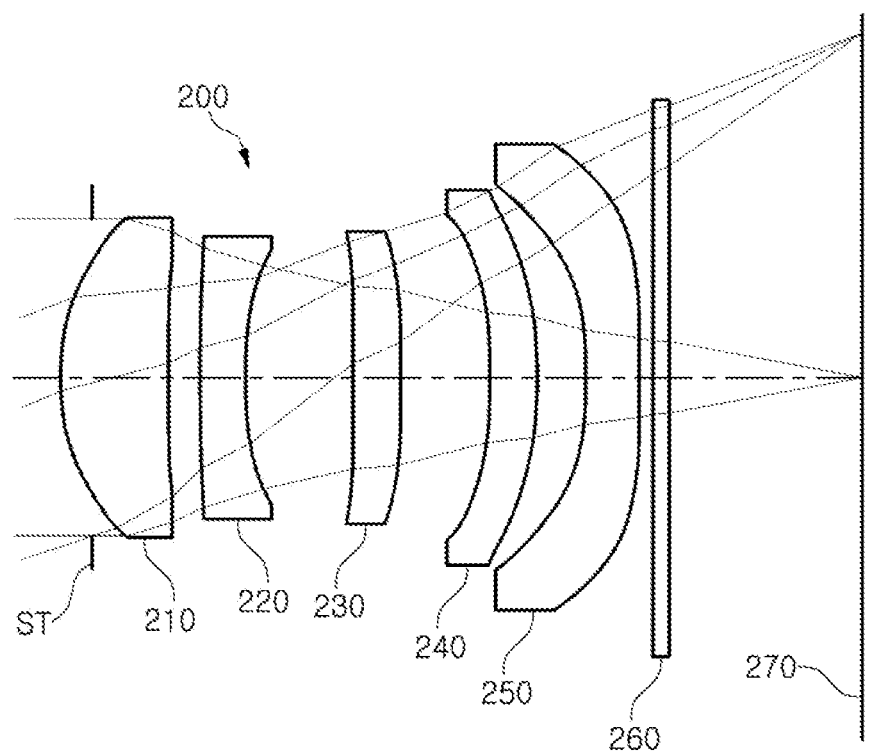
FIG. 4 is a view of an optical imaging system, according to a second embodiment.

An optical imaging system, according to a second embodiment, will be described with reference to FIG. 4.

The optical imaging system 200, according to the second embodiment, includes an optical system including a first lens 210, a second lens 220, a third lens 230, a fourth lens 240, and a fifth lens 250. In addition, the optical imaging system 200 includes a filter 260, an image sensor 270, and a stop ST.

In an embodiment, the first lens 210 has a positive refractive power, and an object-side surface thereof is convex and an image-side surface thereof is concave. For example, the object-side surface of the first lens 210 is convex in a paraxial region, and the image-side surface of the first lens 210 is concave in the paraxial region. The second lens 220 has a negative refractive power, and an object-side surface thereof is convex and an image-side surface thereof is concave. For example, the object-side surface of the second lens 220 is convex in a paraxial region, and the image-side surface of the second lens 220 is concave in the paraxial region. The third lens 230 has a positive refractive power, and an object-side surface thereof is concave and an image-side surface thereof is convex. For example, the object-side surface of the third lens 230 is concave in a paraxial region, and the image-side surface of the third lens 230 is convex in the paraxial region. The fourth lens 240 has a positive refractive power, and an object-side surface thereof is concave and an image-side surface thereof is convex. For example, the object-side surface of the fourth lens 240 is concave in a paraxial region, and the image-side surface of the first lens 240 is convex in the paraxial region. The fifth lens 250 has a negative refractive power, and both surfaces thereof are concave. For example, the object-side surface of the fifth lens 250 is concave in a paraxial region, and the image-side surface of the fifth lens 250 is concave in the paraxial region. The stop ST is adjacently disposed to the object-side surface of the first lens.

Figure 5:
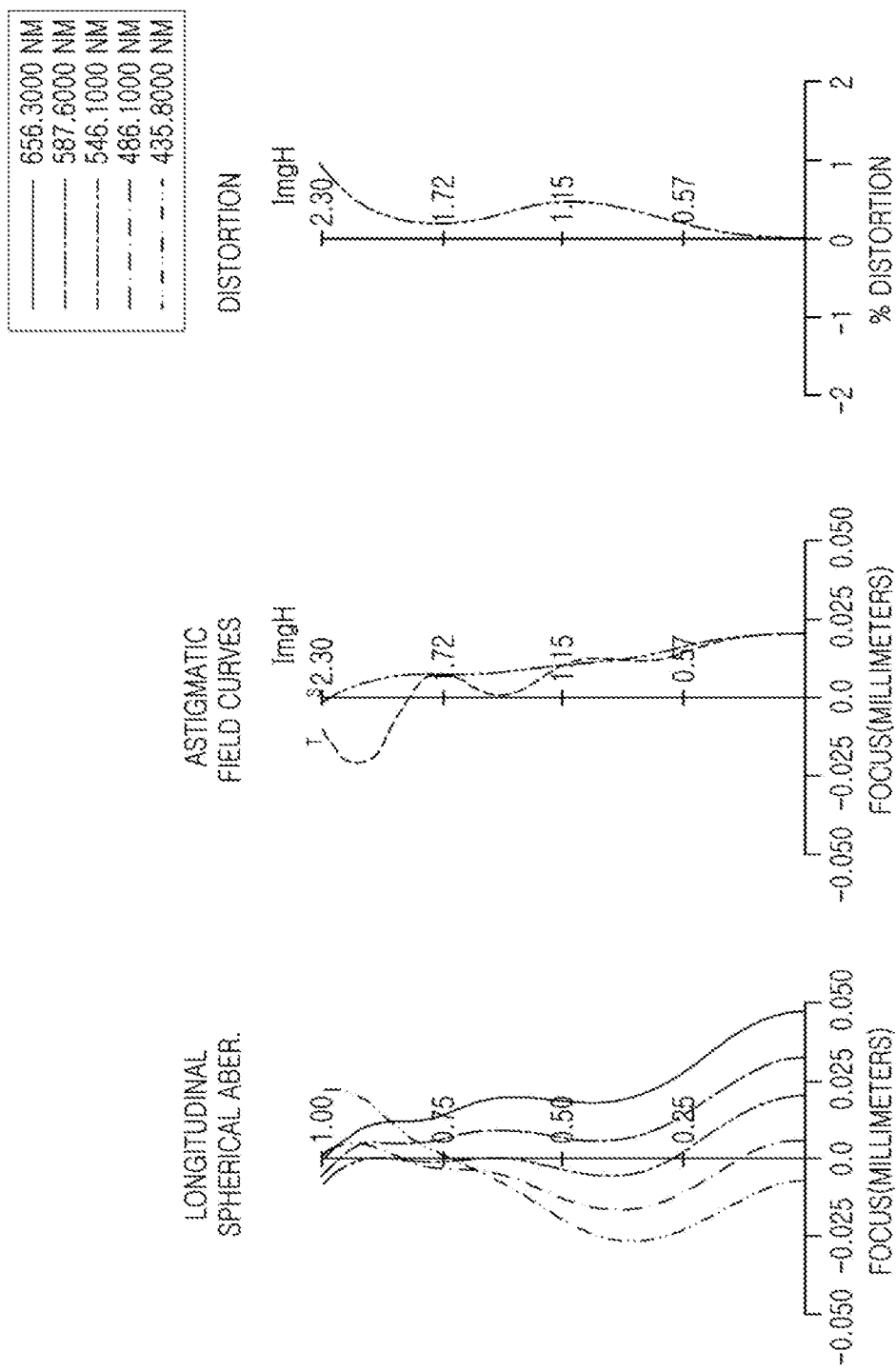
FIG. 5 are graphs representing aberration curves of the optical imaging system illustrated in FIG. 4.

The optical imaging system, configured as described above, may represent aberration characteristics as illustrated in FIG. 5. FIG. 6 is a table representing characteristics of lenses of the optical imaging system, according to the second embodiment.

Table 1 represents optical characteristics of the optical imaging systems, according to the first and second embodiments. An overall focal length of the optical imaging system may be substantially determined in a range of 5.60 to 5.90.

In the optical imaging system, a focal length (f1) of the first lens may be substantially determined in a range of 2.70 to 3.20. In the optical imaging system, a focal length (f2) of the second lens may be substantially determined in a range of −6.0 to −4.0. In the optical imaging system, a focal length (f3) of the third lens may be substantially determined in a range of 10.0 to 24.0. In the optical imaging system, a focal length (f4) of the fourth lens may be substantially determined in a range of 11.0 to 15.0. In the optical imaging system, a focal length (f5) of the fifth lens may be substantially determined in a range of −5.0 to −4.0.

In the optical imaging system, an overall length of the optical system may be substantially determined in a range of 5.40 to 5.90. A half of a field of view of the optical imaging system may be in a range of 21.0 to 24.0.

TABLE 1

| Remarks | First Embodiment | Second Embodiment |
|---|---|---|
| f1 | 2.79 | 3.14 |
| f2 | −4.13 | −5.48 |
| f3 | 11.75 | 23.03 |
| f4 | 13.9 | 11.88 |
| f5 | −4.2 | −4.64 |
| TTL | 5.85 | 5.45 |
| f | 5.80 | 5.70 |
| F-number | 2.60 | 2.60 |
| FOV | 22.0 | 23.0 |
| ImgH | 2.40 | 2.30 |

Table 2 represents values of Conditional Expressions of the optical imaging systems according to the first to second exemplary embodiments.

TABLE 2

| Remarks | Conditional Expression | First Embodiment | Second Embodiment |
|---|---|---|---|
| 1 | TTL/f | 1.009 | 0.956 |
| 2 | TTL/ImgH | 2.438 | 2.370 |
| 3 | FOV | 22.0 | 23.0 |
| 4 | R1/f | 0.252 | 0.266 |

As seen in Table 2, the optical imaging system, according to the first and second embodiments, may satisfy the above Conditional Expressions.

As set forth above, according to an embodiment in the present disclosure, an optical imaging system having a narrow field of view and having a short length may be realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising a convex object-side surface;
a second lens comprising a convex object-side surface and a concave image-side surface;
a third lens comprising a positive refractive power and a refractive index greater than 1.60;
a fourth lens comprising a concave object-side surface; and
a fifth lens comprising a concave object-side surface in a paraxial region,
wherein the first to fifth lenses are sequentially disposed from an object side of the optical imaging system toward an imaging plane of the optical imaging system,
the optical imaging system comprises a maximum number of five lenses,
$0.7 < TTL/f < 1.1$, where TTL is a distance from the object-side surface of the first lens to the imaging plane, and f is an overall focal length of the optical imaging system, and
an absolute value of a focal length of the second lens is less than an absolute value of a focal length of the fourth lens.

2. The optical imaging system of claim 1, wherein the first lens comprises a positive refractive power.

3. The optical imaging system of claim 1, wherein the second lens comprises a negative refractive power.

4. The optical imaging system of claim 1, wherein the fourth lens comprises a positive refractive power.

5. The optical imaging system of claim 1, wherein the fifth lens comprises a negative refractive power.

6. An optical imaging system comprising:
a first lens comprising a convex object-side surface;
a second lens comprising a convex object-side surface and a concave image-side surface;
a third lens comprising a refractive index greater than 1.60;
a fourth lens comprising a concave object-side surface; and
a fifth lens comprising a concave object-side surface in a paraxial region,
wherein the first to fifth lenses are sequentially disposed from an object side of the optical imaging system toward an imaging plane of the optical imaging system,
the optical imaging system comprises a maximum number of five lenses,
$20 < FOV < 35$, where FOV is one-half of a field of view of the optical imaging system,
$0.7 < TTL/f < 1.1$, where TTL is a distance from the object-side surface of the first lens to the imaging plane, and f is an overall focal length of the optical imaging system, and
an absolute value of a focal length of the second lens is less than an absolute value of a focal length of the fourth lens.

7. The optical imaging system of claim 6, wherein the first lens comprises a positive refractive power.

8. The optical imaging system of claim 6, wherein the second lens comprises a negative refractive power.

9. The optical imaging system of claim 6, wherein the fourth lens comprises a positive refractive power.

10. The optical imaging system of claim 6, wherein an object-side surface of the third lens is concave.

11. The optical imaging system of claim 1, wherein the fourth lens further comprises a refractive index greater than 1.60.

12. The optical imaging system of claim 6, wherein the fourth lens further comprises a refractive index greater than 1.60.

13. The optical imaging system of claim 6, wherein the third lens further comprises a positive refractive power.

14. The optical imaging system of claim 6, wherein a focal length of the first lens is in a range of 2.70 to 3.20.

* * * * *